US007239048B2

(12) United States Patent
Ehrlich et al.

(10) Patent No.: US 7,239,048 B2
(45) Date of Patent: Jul. 3, 2007

(54) SAFETY SWITCHING APPARATUS FOR SAFELY DISCONNECTING AN ELECTRICAL LOAD

(75) Inventors: Gerhard Ehrlich, Reichenbach (DE); Richard Veil, Stuttgart (DE); Thomas Peter, Reichenbach (DE)

(73) Assignee: Pilz GmbH & Co., Ostfildern (DE)

( * ) Notice: Subject to any disclaimer, the term of this patent is extended or adjusted under 35 U.S.C. 154(b) by 384 days.

(21) Appl. No.: 10/800,098

(22) Filed: Mar. 12, 2004

(65) Prior Publication Data

US 2004/0174074 A1 Sep. 9, 2004

Related U.S. Application Data

(63) Continuation of application No. PCT/EP02/09433, filed on Aug. 23, 2002.

(30) Foreign Application Priority Data

Sep. 22, 2001 (DE) ................................ 101 46 753

(51) Int. Cl.
*H02H 11/00* (2006.01)

(52) U.S. Cl. ...................................................... 307/326

(58) Field of Classification Search ................. 307/326
See application file for complete search history.

(56) References Cited

FOREIGN PATENT DOCUMENTS

| | | |
|---|---|---|
| DE | 199 60 399 A1 | 4/2001 |
| EP | 0 681 310 A1 | 11/1995 |
| EP | 1 202 313 A1 | 5/2002 |
| JP | 56-13359 | 3/1981 |
| JP | 5-273281 | 10/1993 |
| JP | 6-331679 | 12/1994 |
| WO | 01/37302 A1 | 5/2001 |

*Primary Examiner*—Robert L. Deberadinis
(74) *Attorney, Agent, or Firm*—Harness, Dickey & Pierce, P.L.C

(57) ABSTRACT

A safety switching apparatus for safely disconnecting an electrical load, such as an electrical machine, has at least one output switch with at least two switching positions. The output switch is for interrupting an external power supply path to the load. The safety switching apparatus further has a control unit which controls the switching position of the output switch. The control unit is capable of monitoring the actual switching position of the output switch by means of an RF test signal which is transmitted from an RF generator to the output switch.

20 Claims, 2 Drawing Sheets

SAFETY SWITCHING APPARATUS FOR SAFELY DISCONNECTING AN ELECTRICAL LOAD

CROSS-REFERENCES TO RELATED APPLICATIONS

This application is a continuation of copending international patent application PCT/EP02/09433 filed on Aug. 23, 2002 designating the U.S., which international patent application is published in German language and claims priority from German patent application DE 101 46 753.2, filed on Sep. 22, 2001.

BACKGROUND OF THE INVENTION

The present invention relates to safety switching apparatuses for safely disconnecting an electrical load, and in particular to apparatuses for safely disconnecting an electrical machine. Even more specifically, the present invention relates to such a safety switching apparatus comprising at least one output switch for interrupting an external power supply path, the output switch having at least two switching positions, and comprising a control unit which controls and monitors the switching position of the output switch.

Prior art safety switching apparatuses are especially used in industry for at least partially disconnecting electrically driven machines, such as large brake presses, CNC-controlled machining centers or robots, in a reliable manner. A typical application is the disconnection of a machine when a guard door is opened, a light barrier is interrupted or an emergency off switch is actuated. The signals from these signal transmitters are fed to the prior art safety switching apparatuses which disconnect the corresponding machine or machine parts in response thereto. In this case, the actual disconnection process, i.e. the interruption of a power supply to the machine, must take place in an extremely reliable manner, since otherwise the health or even the life of the operator is put at risk. Prior art safety switching devices are therefore approved for operation by relevant regulatory authorities, such as professional associations (BG) in Germany, only if they meet the specific minimum requirements for their intrinsic failsafety. In general, a safety switching apparatus must allow to disconnect the machine in a reliable and failsafe manner even when faults or disruptions occur within the safety switching apparatus or the signal transmitters associated with it.

Therefore, only devices and systems that meet at least Category 3 of European Standard EN 954-1 or a corresponding safety standard are considered as safety switching apparatuses within the meaning of the present invention.

With prior art safety switching apparatuses, the switching position of the output switch, with which the power supply to the machine can be interrupted, must always be monitored in a reliable and failsafe manner. The reason for this is the fact that, otherwise, a fault or a disruption in the operation of the output switch may lead to the monitored machine being in a dangerous, unsafe state. For long and up to now, electromechanical switching elements, i.e. relays or contactors, have often been used for the output switches in prior art safety switching apparatuses. Such switching elements are known to be subject to the risk of the switching contacts welding together owing to sparking when the switch is opened. In this case, the output switch can no longer be opened, which may have devastating consequences.

Only in recent times have semiconductor components also been used as output switches in prior art safety switching apparatuses. Although mechanical contacts cannot weld together with these semiconductor components, there is basically the possibility of the switching path through the component breaking down and thus likewise of a short circuit forming which can no longer be opened.

WO 01/37302 A1 discloses a prior art safety switching apparatus which has two relays as output switches on the output side. The make contacts of the two relays are connected in series in a manner known per se in order to achieve redundancy and thus increased reliability on disconnection. Each of the two relays has two or more make contacts such that, for example, all three phases of a three-phase connection can be disconnected. In addition, each of the two relays has an auxiliary contact which is positively (forcibly) driven by the make contacts through a mechanical link. This mechanically positively driven operation ensures that the switching position of the make contacts corresponds to the switching position of the auxiliary contact. The switching position of the make contacts can thus be monitored by means of the auxiliary contact.

The described arrangement is widely used in practice and has proved very successful. One disadvantage, however, is that relays with positively driven contacts are considerably more expensive than basic relays. In addition, positively driven relays are larger and have lower holding forces than basic relays.

SUMMARY OF THE INVENTION

In view of the above, it is an object of the present invention to provide an alternative which allows to avoid positively driven relays in a safety switching apparatus.

It is a further object to provide a less expensive safety switching apparatus still fulfilling all the safety requirements with respect to failsafety and reliability.

It is yet another object to provide a safety switching apparatus which is smaller in terms of space requirements.

According to one aspect of the invention, these and other objects are achieved by a safety switching apparatus of the type mentioned initially further having a radio-frequency (RF) generator for generating an RF test signal, and a coupling circuit which is used to transmit the RF test signal to the output switch thereby allowing to monitor the switching positions.

With the new safety switching apparatus, the switching position of the output switch is monitored by means of an RF test signal which is fed to the output switch in addition to the load current which is actually to be connected. Since the frequencies of the load currents to be connected are generally very low (in the range from 16⅔ to 400 Hz), a radio-frequency signal is highly suitable since it is technically very easy to isolate it from the load current again using filtering measures known per se. The frequency of the test signal preferably lies in the range from 2 MHz to 100 MHz. On the other hand, the test signal used here is an electrical signal, which means that the electrically effective switching position of the output switch can be monitored particularly well.

The safety switching apparatus according to the invention has the advantage that use of positively driven relays or contactors can be dispensed with, which means that the production costs can be reduced. In addition, the safety switching apparatus according to the invention may be more compact and have a lower space requirement.

A further advantage is the fact that the switching position of semiconductor components may also be monitored in a reliable manner with the approach according to the invention. The basic concept for the device may thus also be used for future generations of safety switching apparatuses.

In a refinement of the invention, the coupling circuit has at least one isolating element which provides DC isolation between the RF generator and the at least one output switch.

This allows to implement the output circuit of the safety switching apparatus in a floating manner (without a fixed ground potential), which increases both the safety and the range of applications of the apparatus according to the invention. In addition, the monitoring circuit, which generally operates only at low voltages and currents, is now protected against the generally higher load currents supplied to the monitored machine.

In a further refinement, the isolating element has at least one coupling capacitor.

This measure prevents a DC short circuit in the output switch, which further increases the safety of the apparatus overall.

In a further refinement, the coupling capacitor has a printed circuit board capacitance.

This measure makes it possible to reduce the number of discrete components required, which enables cost-effective production. In addition, the apparatus according to the invention may be even smaller, i.e. have an even lower space requirement.

In a further refinement of the previously mentioned approach, the printed circuit board capacitance has conductor surfaces which are arranged on different layers of an at least two-layer printed circuit board.

This measure has considerable advantages, in particular in relation to the intended field of application for the safety switching apparatus, since disruption during operation as a result of a faulty coupling capacitor can be reliably ruled out with the described arrangement. For fault analysis, the relevant standards allow faults to be ruled out which are based on a short circuit between different layers of a conventional printed circuit board. The safety switching apparatus may therefore be simpler overall, and thus less expensive.

In a further refinement, the coupling circuit has at least two coupling capacitors.

This measure further increases the intrinsic failsafety of the apparatus according to the invention. In particular, a DC short circuit in the output switch is thus ruled out even more reliably. In addition, symmetry results which makes it possible to monitor the switching position of the output switch in a particularly simple and, at the same time, accurate manner.

In a further refinement of the invention, the coupling circuit has an electrical resonant circuit.

Owing to the sensitivity, known per se, of a resonant circuit to changes in the influencing parameters, this measure makes it possible to monitor the output switch in a simple and particularly precise manner.

In a further refinement of the measure mentioned previously, the output switch is embedded in the resonant circuit.

This measure is a particularly simple way of precisely monitoring the switching position of the output switch. In addition, this arrangement saves on modules, making it possible to further reduce the production costs of the apparatus according to the invention.

In a further refinement, the resonant circuit interacts with at least one ohmic resistor whose voltage drop is a measure of the actual switching position of the output switch.

The current flowing into the resonant circuit is preferably fed via said ohmic resistor. This measure makes it possible to use a simple threshold value switch to determine the switching position of the output switch. It is in this case possible to tap off a voltage drop across the ohmic resistor using means known per se in a very simple and inexpensive manner. Overall, the production costs of the apparatus according to the invention can thus be reduced even further.

In a further refinement, the output switch is connected to at least one connection terminal, with a radio-frequency (RF) filter being arranged between the output switch and the connection terminal.

On the one hand, this measure prevents the RF test signal from being able to pass to the outside from the inside of the safety switching device, thus preventing the machine to be disconnected from being influenced by it. On the other hand, the RF test signal is decoupled in this manner from external influences, which increases reliability and measurement accuracy when monitoring the switching position of the output switch.

It goes without saying that the abovementioned features and those yet to be mentioned can be used not only in the combination given in each case but also in other combinations or on their own without departing from the scope of the present invention.

BRIEF DESCRIPTION OF THE DRAWINGS

Exemplary embodiments of the invention are illustrated in the drawing and are explained in more detail in the following description. In the drawing.

DETAILED DESCRIPTION OF PREFERRED EMBODIMENTS

Figure 1:
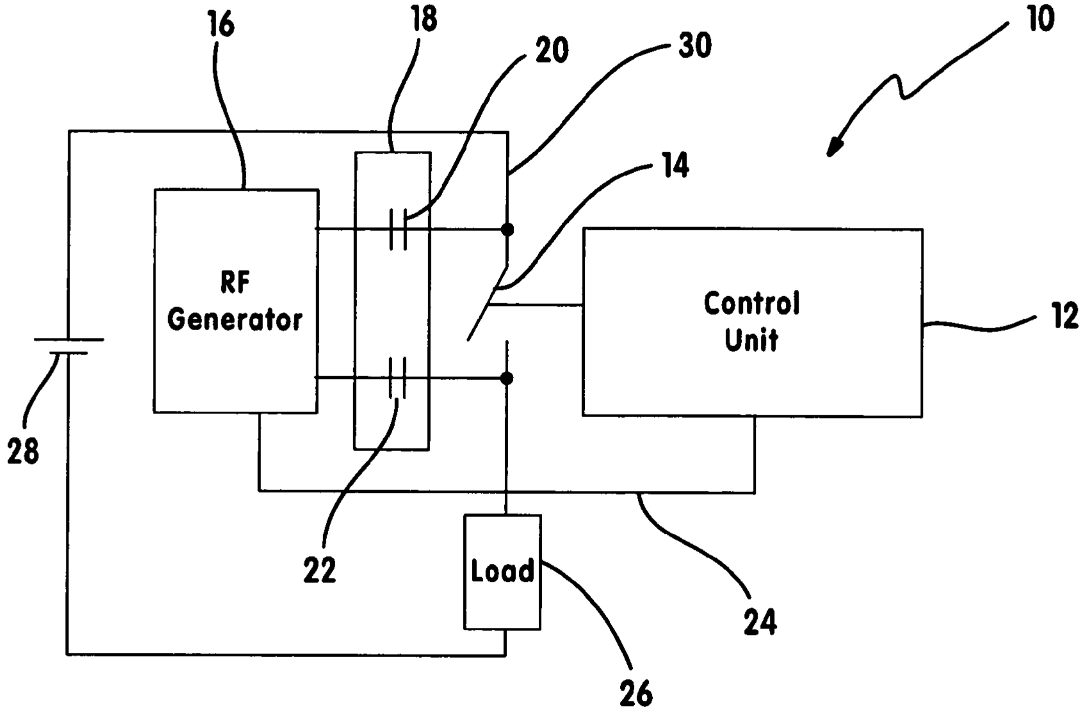
FIG. 1 shows a basic circuit diagram of an arrangement for use in a safety switching apparatus according to the invention.

In FIG. 1, an arrangement for failsafe monitoring of the switching position of an output switch has the reference numeral 10 in its entirety.

The arrangement 10 has a control unit 12 which controls the switching position of an output switch 14 in a manner known per se. The output switch 14 is illustrated in the present case as a relay contact. However, the principle of the arrangement 10 can also be applied in the same manner to semiconductor switches, such as MOS transistors.

The reference numeral 16 is given to an RF generator which is connected to the output switch 14 via a DC isolating element 18 such that an RF test signal (RF voltage and/or RF current), not illustrated here, is fed through the output switch 14.

According to a preferred embodiment of the invention, the isolating element 18 has two coupling capacitors 20, 22 which in all cases prevent a DC short circuit in the output switch 14.

The RF generator 16 has a sensor element (not illustrated separately here) which detects a change in the RF test signal as a function of the switching position of the output switch 14. For example, the resonant frequency of the RF generator 16, the RF current flowing through the coupling capacitors 20, 22 or the power produced in the RF generator change as a function of the switching position of the output switch 14. The detected change is communicated to the control unit 12 via a feedback line 24. As a result, the control unit 12 can constantly compare the actual switching position of the output switch 14 with the selected nominal switching position and can thus monitor the output switch 14. The control unit 12 can check, in the manner of a self-test, that all of the modules are operating properly by the output switch 14 being switched over and a check being made to determine whether the reaction on the line 24 corresponds to the expected value.

For the purpose of illustrating the principle of the arrangement 10, reference numeral 26 schematically represents a load which, in a specific application, is a machine to be disconnected, for example. The machine 26 is supplied with power via power supply 28, the output switch 14 being arranged in the power supply path 30. In this case, the power supply 28 may also be an AC voltage source instead of the DC voltage source illustrated.

Figure 2:
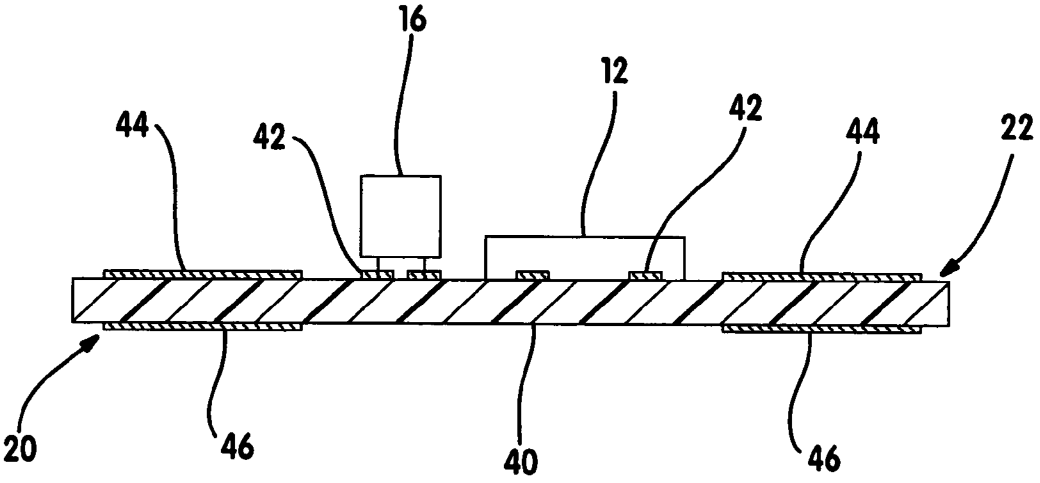
FIG. 2 shows a preferred embodiment of coupling capacitors which are also used in the basic circuit diagram shown in FIG. 1.

FIG. 2 shows a preferred embodiment of the two coupling capacitors 20, 22, with identical reference numerals being used for the same elements as in FIG. 1.

The circuit components of the arrangement 10 are arranged on a printed circuit board 40 in a manner known per se. In this case, the circuit components, such as the RF generator 16 and the control unit 12 (illustrated as an IC in this case), are connected to one another via conductor tracks 42. The two coupling capacitors 20, 22 are formed by conductor surfaces 44, 46 which are arranged here on different layers of the two-layer printed circuit board 40. The plastic material of the printed circuit board 40 is thus between the metallic conductor surfaces 44, 46, and a capacitance is thus formed in a manner which is readily apparent to those skilled in the art. When analyzing sources of faults within the arrangement 10, the described arrangement rules out the possibility of one or both coupling capacitors 20, 22 being subjected to an electrical short circuit. This fault is ruled out on the basis of existing, relevant standards.

Figure 3:
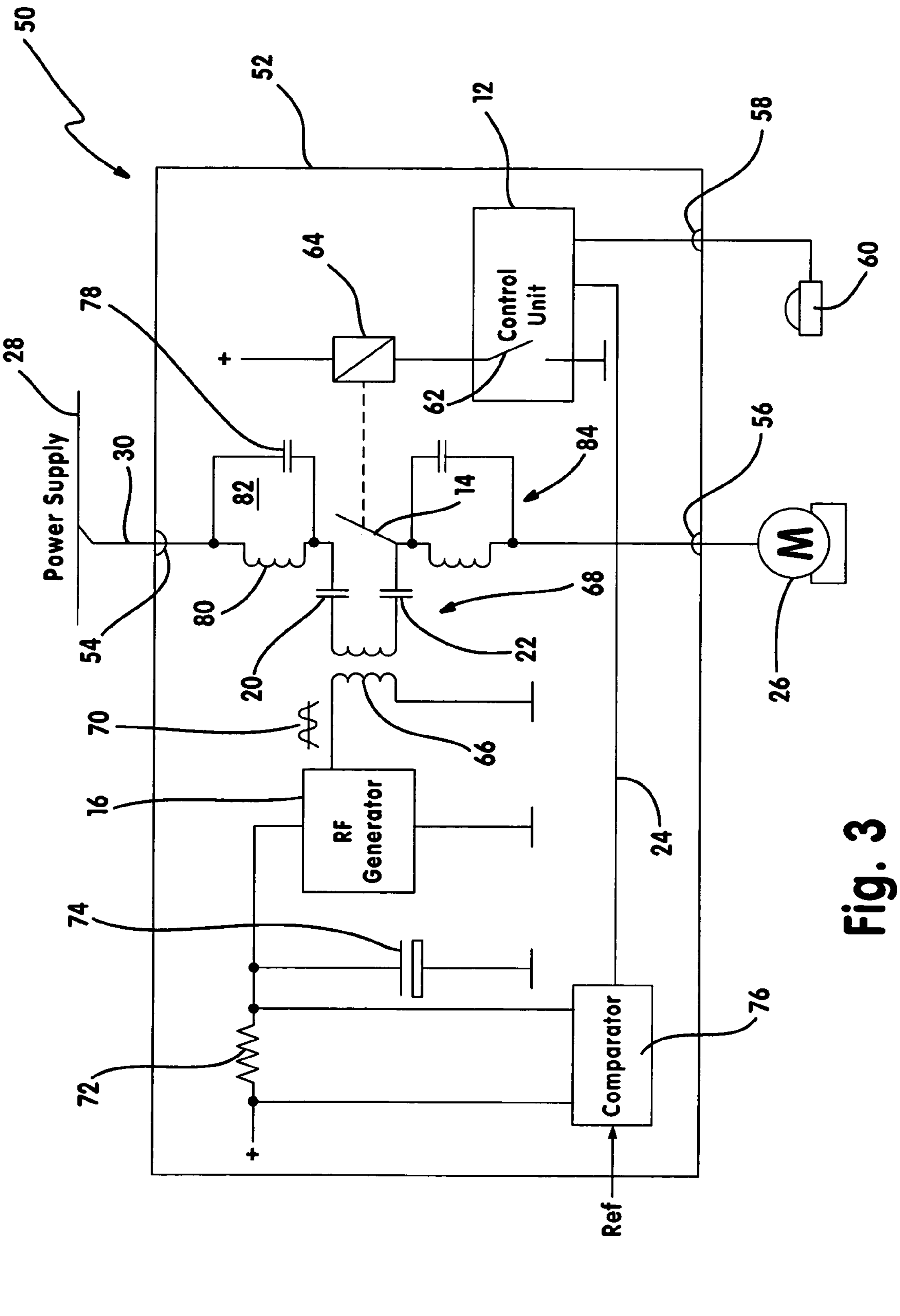
FIG. 3 shows a detailed illustration of a safety switching apparatus according to the invention.

In FIG. 3, an exemplary embodiment of a safety switching apparatus according to the invention has is designated by reference numeral 50 in its entirety. In this case it is a so-called safety switching device which is generally distributed as a compact and fully operational unit. The invention is not, however, limited only to safety switching devices and may also be used for more complex, programmable safety controllers.

The safety switching device 50 is incorporated as a compact unit in a device housing 52 in a manner known per se. Connection terminals (three of which, by way of example, have the reference numerals 54, 56, 58 here) are provided on an outer face of the housing 52 in a manner known per se. Connection terminal 54 is connected to one phase of the power supply 28. Connection terminal 56 is connected to the machine 26 to be disconnected. The power supply path 30 in which the output switch 14 is arranged in series is thus provided between the connection terminals 54 and 56.

The illustration of the safety switching device 50 is simplified here for reasons of clarity. In practice there are generally two output switches 14 connected in series with one another in the power supply path 30, in order to achieve redundancy when the machine 26 is disconnected. Furthermore, the safety switching device 50 according to the invention generally has further output switches, which are arranged in parallel with the output switch 14, and corresponding connection terminals 54, 56, by means of which further phases of the power supply 28 can be connected. Such refinements are known per se and are therefore not described here in any more detail.

An emergency off switch 60 is connected to the connection terminal 58 in a manner known per se. This is also shown here in FIG. 3 in a simplified form, since emergency off switches are generally subject to multichannel evaluation by the safety switching devices described here.

Internally, the safety switching device 50 has the following design:

The control unit 12 has a switch 62 which connects or disconnects the current in a manner known per se by means of a relay 64. The output switch 14 is one of the make contacts of the relay 64 so that the control unit 12 can control the switching position of the output switch 14 by means of the switch 62. However, in alternative exemplary embodiments, semiconductor components may also be used instead of a relay 64 as the output switch.

The output switch 14 is connected to an RF generator 16 in a manner which has already been described with reference to FIG. 1. In addition to the two coupling capacitors 20, 22, the isolating element in this case has a transformer 66, whose inductance, together with the coupling capacitors 20, 22, forms a resonant circuit 68. The RF generator, which in the present exemplary embodiment is an 8 MHz commercially available RF oscillator, generates the RF test signal which has the reference numeral 70 in this figure. The RF generator 16 is supplied with an operating voltage via a resistor 72. In order to stabilize and smooth the operating voltage, a capacitor 74 is arranged in parallel with the RF generator 16.

Arranged in parallel with the resistor 72 is a threshold value switch 76 which compares the voltage drop across the resistor 72 with a reference value. The output signal of the threshold value switch 76 is fed to the control unit 12 via the feedback line 24.

A further capacitor which, together with a coil 80, forms an LC filter 82 has the reference numeral 78. The LC filter 82 is arranged between the output switch 14 and the connection terminal 54. An identical second LC filter 84 is also arranged between the output switch 14 and the connection terminal 56. The two LC filters 82, 84 form a clamp which may also surround further, redundant switching contacts arranged in series with the output switch 14.

The safety switching device 50 operates as follows:

When the safety switching device 50 is in operation, the output switch 14 is closed so that the machine 26 is connected to the power supply 28. The machine 26 is therefore in operation.

The open output switch 14 represents a capacitance of the order of magnitude of approximately 1 pF. When the output switch 14 is open, this capacitance essentially determines the resonant frequency of the resonant circuit 68, since the capacitances of the coupling capacitors 20, 22 are approximately 100 pF. The resonant frequency of the resonant circuit 68 corresponds in this switching position to the desired frequency of the RF generator 16.

If the output switch 14 is closed, its effective capacitance changes, thus mistuning the resonant circuit 68.

In return, this has an effect on the RF generator 16 via the transformer 66, and this further results in the voltage drop across the resistor 72 changing. The changed voltage drop is detected by means of the threshold value switch 76 and is communicated to the control unit 12. This allows the control unit 12 to compare the actual switching position of the output switch 14 with the intended desired position. Consequently, this makes it possible to monitor the switching position of the output switch 14.

The circuit of the safety switching device 50, as illustrated in FIG. 3, has proved to be particularly effective in practical tests. It goes without saying, however, that the basic principle of the invention may also have other circuit variants.

What is claimed is:

1. A safety switching apparatus for safely disconnecting an electrical load from a power supply, the apparatus comprising:

at least one output switch serially arranged within a power supply path to the load, wherein the at least one output switch has at least two different switching positions, a control unit adapted to control the switching positions, an RF generator for generating an RF test signal, and a coupling circuit adapted to lead the RF test signal across the at least one output switch, wherein the control unit is adapted to monitor the switching positions by means of the RF test signal, wherein the coupling circuit is a resonant circuit having a resonance frequency, and wherein the output switch is embedded in the resonant circuit such that the resonance frequency is changed in response to the switching position.

2. The safety switching apparatus of claim 1, wherein the coupling circuit has at least one isolating element providing DC isolation between the RF generator and the at least one output switch.

3. The safety switching apparatus of claim 1, wherein the coupling circuit has at least one coupling capacitor.

4. The safety switching apparatus of claim 3, wherein the coupling capacitor is implemented as a printed circuit board capacitance.

5. The safety switching apparatus of claim 4, wherein the printed circuit board capacitance comprises conductor surfaces which are arranged on different layers of a multilayer printed circuit board.

6. The safety switching apparatus of claim 3, wherein the coupling circuit has at least two coupling capacitors.

7. The safety switching apparatus of claim 1, further comprising a resistor arranged in series with the RF generator, wherein the resonant circuit interacts with the resistor such that a voltage drop across the resistor is a measure of the actual switching position of the output switch.

8. The safety switching apparatus of claim 1, further comprising a housing accommodating the output switch, said housing having at least one connection terminal, and comprising an RF filter being arranged between the output switch and the connection terminal.

9. A safety switching apparatus for safely disconnecting an electrical load from a power supply, the apparatus comprising:

at least one output switch serially arranged within a power supply path to the load, wherein the at least one output switch has at least two different switching positions, a control unit adapted to control the switching positions, an RF generator for generating an RF test signal, and a coupling circuit adapted to transmit the RF test signal to the at least one output switch for monitoring the switching position, wherein the coupling circuit has at least one isolating element providing DC isolation between the RF generator and the at least one output switch.

10. The safety switching apparatus of claim 9, wherein the coupling capacitor is implemented as a printed circuit board capacitance comprising conductor surfaces which are arranged on different layers of a multi-layer printed circuit board.

11. A safety switching apparatus for safely disconnecting an electrical load, comprising at least one output switch for interrupting a power supply path to the load, the output switch having at least two switching positions, comprising a control unit for controlling the switching position of the output switch, and further comprising an arrangement for monitoring the switching position of the output switch, wherein the arrangement comprises an RF generator for generating an RF test signal, and a coupling circuit adapted to transmit the test signal to the output switch.

12. The safety switching apparatus of claim 11, wherein the coupling circuit has at least one isolating element which provides DC isolation between the RF generator and the at least one output switch.

13. The safety switching apparatus of claim 11, wherein the coupling circuit has at least one coupling capacitor.

14. The safety switching apparatus of claim 13, wherein the coupling capacitor has a printed circuit board capacitance.

15. The safety switching apparatus of claim 14, wherein the printed circuit board capacitance has conductor surfaces which are arranged on different layers of an at least two-layer printed circuit board.

16. The safety switching apparatus of claim 13, wherein the coupling circuit has at least two coupling capacitors.

17. The safety switching apparatus of claim 11, wherein the coupling circuit comprises an electrical resonant circuit.

18. The safety switching apparatus of claim 17, wherein the output switch is part of the resonant circuit.

19. The safety switching apparatus of claim 17, further comprising a resistor arranged in series with the RF generator, wherein the resonant circuit interacts with the resistor such that a voltage drop across the resistor is a measure of the actual switching position of the output switch.

20. The safety switching apparatus of claim 11, further comprising a housing accommodating the output switch, said housing having at least one connection terminal, and comprising an RF filter being arranged between the output switch and the connection terminal.

* * * * *